(12) United States Patent
Hodgson

(10) Patent No.: US 7,083,333 B2
(45) Date of Patent: Aug. 1, 2006

(54) OPTICAL PACKAGES AND METHODS TO MANUFACTURE THE SAME

(75) Inventor: Craig W. Hodgson, Thousand Oaks, CA (US)

(73) Assignee: Intel Corporation, Santa Clara, CA (US)

(*) Notice: Subject to any disclaimer, the term of this patent is extended or adjusted under 35 U.S.C. 154(b) by 241 days.

(21) Appl. No.: 10/652,093

(22) Filed: Aug. 29, 2003

(65) Prior Publication Data

US 2005/0047726 A1     Mar. 3, 2005

(51) Int. Cl.
*G02B 6/36* (2006.01)

(52) U.S. Cl. .............................. 385/79; 385/53; 385/76; 385/77; 385/78

(58) Field of Classification Search .................. 385/53, 385/76–79
See application file for complete search history.

(56) References Cited

U.S. PATENT DOCUMENTS

| | | | |
|---|---|---|---|
| 4,252,294 A | 2/1981 | Uchio | 249/105 |
| 4,534,616 A | 8/1985 | Bowen et al. | 350/96.2 |
| 4,718,744 A | 1/1988 | Manning | 350/96.2 |
| 5,159,491 A | 10/1992 | Richards | 359/641 |
| 5,345,336 A | 9/1994 | Aoyama et al. | 359/628 |
| 5,742,720 A | 4/1998 | Kobayashi et al. | 385/89 |
| 5,894,535 A | 4/1999 | Lemoff et al. | 385/47 |
| 6,751,379 B1 * | 6/2004 | Capewell et al. | 385/36 |
| 2002/0064191 A1 | 5/2002 | Capewell et al. | 372/14 |
| 2003/0081924 A1 | 5/2003 | Yegnanarayanan et al. | 385/132 |
| 2004/0042736 A1 | 3/2004 | Capewell et al. | 385/89 |
| 2004/0061346 A1 | 4/2004 | Capewell | 294/64.1 |
| 2004/0062479 A1 | 4/2004 | Capewell | 385/36 |

FOREIGN PATENT DOCUMENTS

| | | |
|---|---|---|
| EP | 0613032 A2 | 11/1994 |
| EP | 0857992 A2 | 12/1998 |
| EP | 1004907 A2 | 5/2000 |

OTHER PUBLICATIONS

*Applications of Optical Filters* [online]. Intor, Inc., "Excellence in Optics", [retrieved on May 11, 2004]. Retrieved from the Internet:<URL: http://www.intor.com/applications.html>, Aug. 8, 2002, 9 pages.

Edward S. Chang, *10 GbE CWDM 850 nm VCSEL for Installed and New MM Fiber*, IEEE 802.3ae, Ottawa, May 2000, 15 pages.

(Continued)

*Primary Examiner*—Jennifer Doan
(74) *Attorney, Agent, or Firm*—Hanley, Flight & Zimmerman, LLC

(57) ABSTRACT

Housings for use in optical packages, optical packages, and methods to manufacture the same are disclosed. A disclosed optical assembly includes a housing having a ferrule to receive an optical fiber; a lens; an annular mechanical interface; and a total internal reflection surface disposed between the ferrule and the lens to direct light between the ferrule and the lens. The example optical package also includes an optical element coupled to the mechanical interface of the housing to form a sealed chamber. The lens is disposed within the sealed chamber substantially in optical alignment with the optical element.

27 Claims, 8 Drawing Sheets

OTHER PUBLICATIONS

Aronson et al., *Low-Cost Multimode WDM for Local Area Networks Up to 1o Gb/s,* IEEE Photonics Technology Letters, vol. 10, No. 10, Oct. 1998, pp. 1489-1491.
*Zigzag waweguide demultiplexer for multicode WDM LAN,* Electronics Letters, vol. 34, No. 10, pp. 1014-1016.
Brian E. Lemoff, *WWDM Transceiver Module for 10-Gb/s Ethernet,* IEEE 802.3 HSSG Interim Meeting, Coeur d'Alene, Idaho, Jun. 1-3, 1999, 32 pages.

Eric B. Grann, Kelly Herrity, *8 Channel VCSEL Tranceiver for 10-Gig,* IEEE 80.3. HSSG Interim Meeting, Dallas, Texas, Jan. 18-20, 2000, 18 pages.
Bill Wiedermann, *Evaluating 10GBASE-SX CWDM,* IEEE 802.3ae Interim Meeting, Otawa, May 2000, pp. 1-21.
*Fiber Collimators/Focusers,* OZ Optics Ltd., 1999, 4 pages.

* cited by examiner

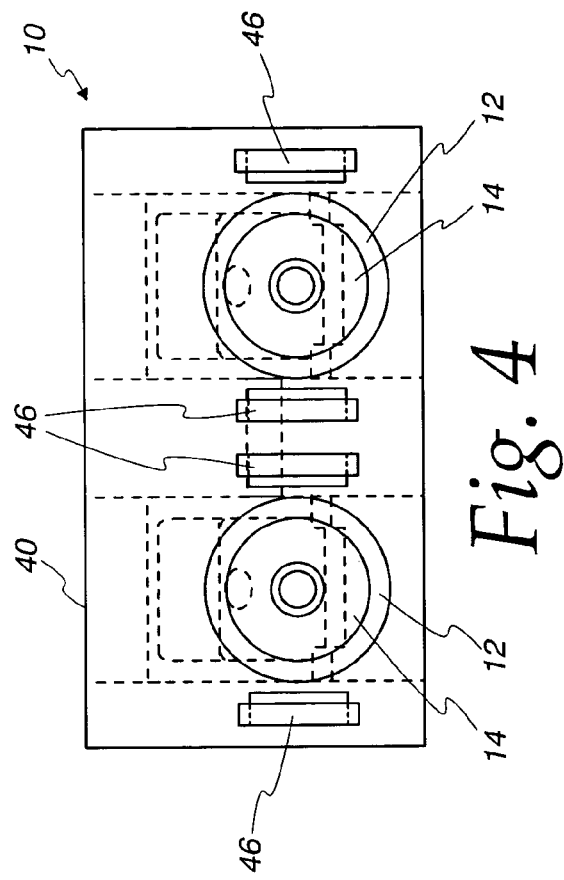
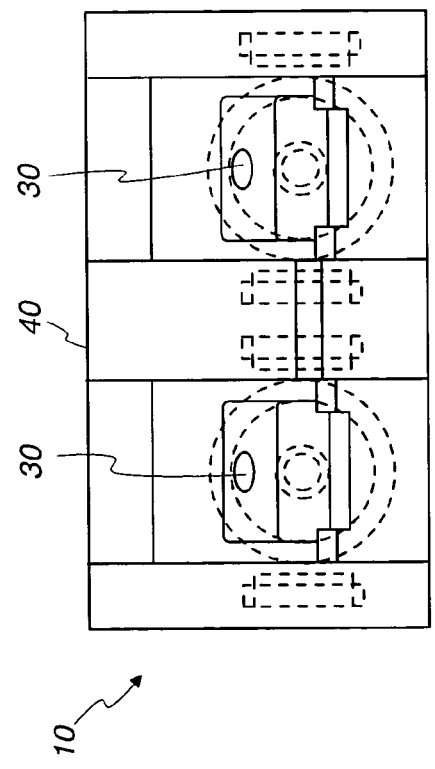
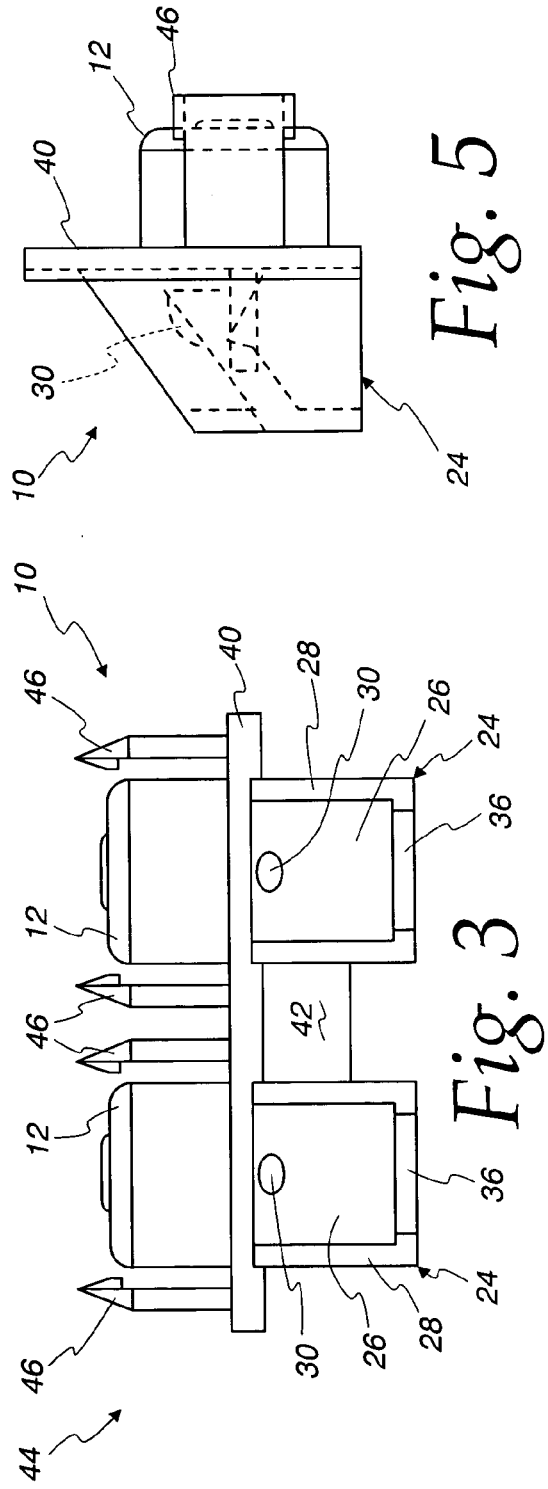

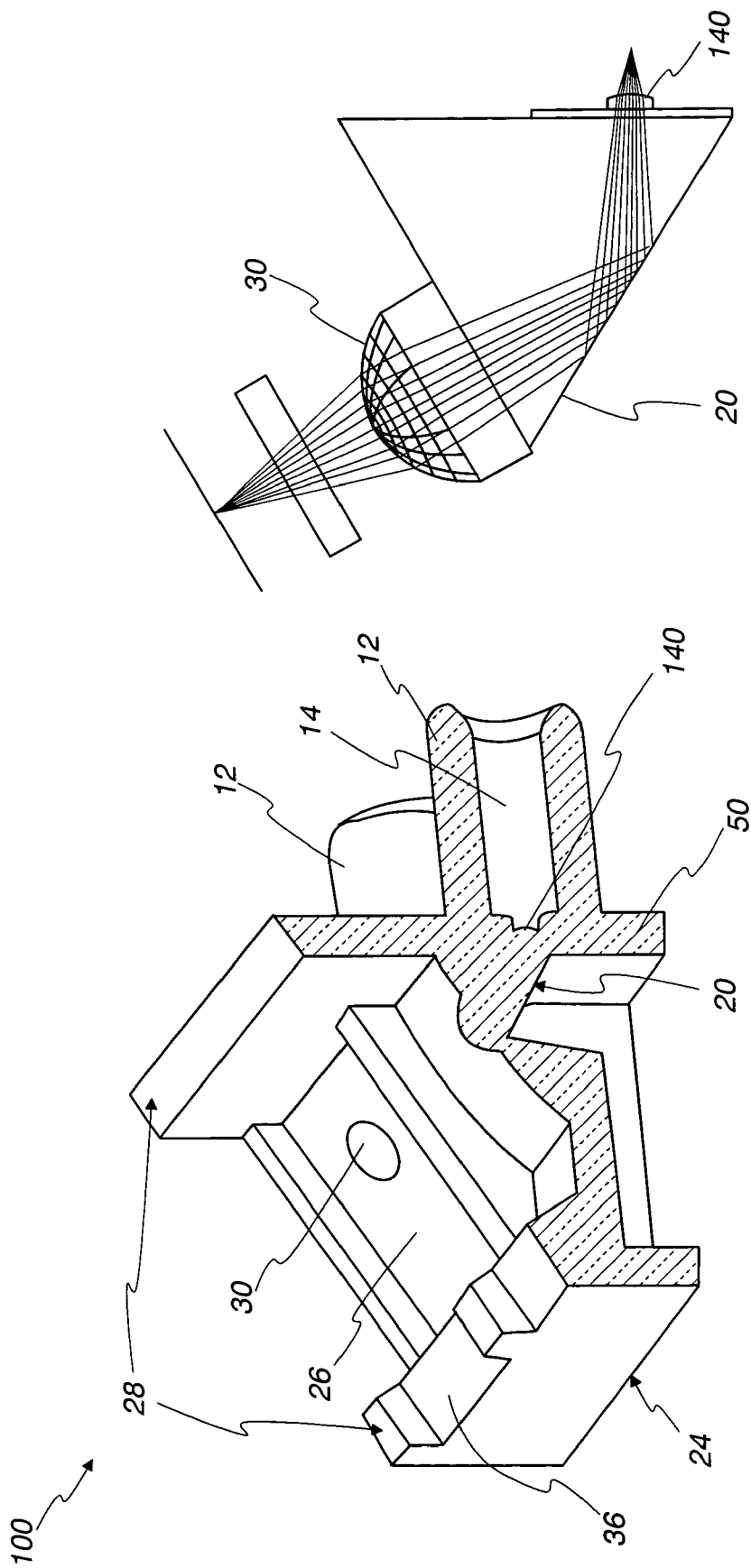

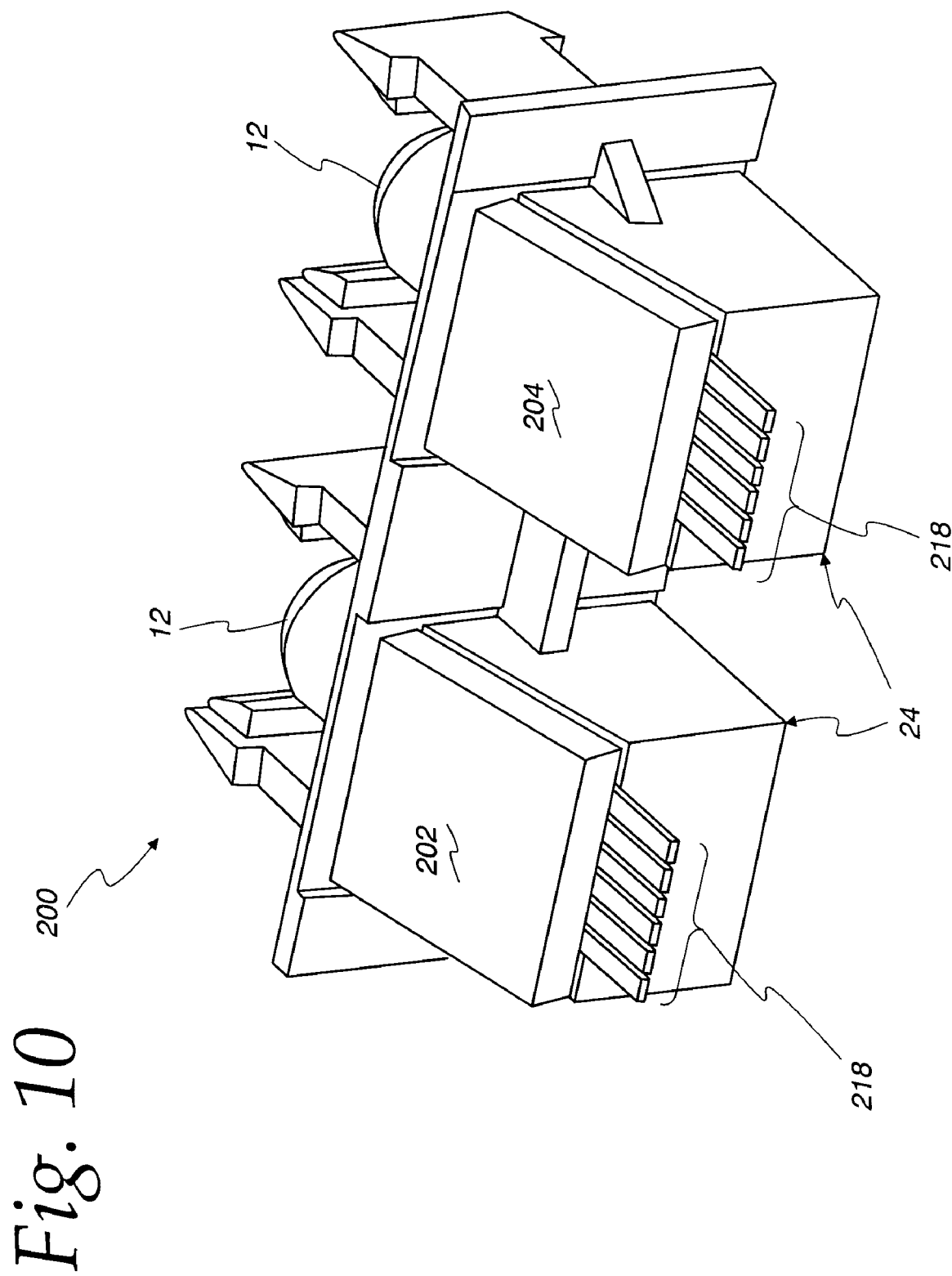

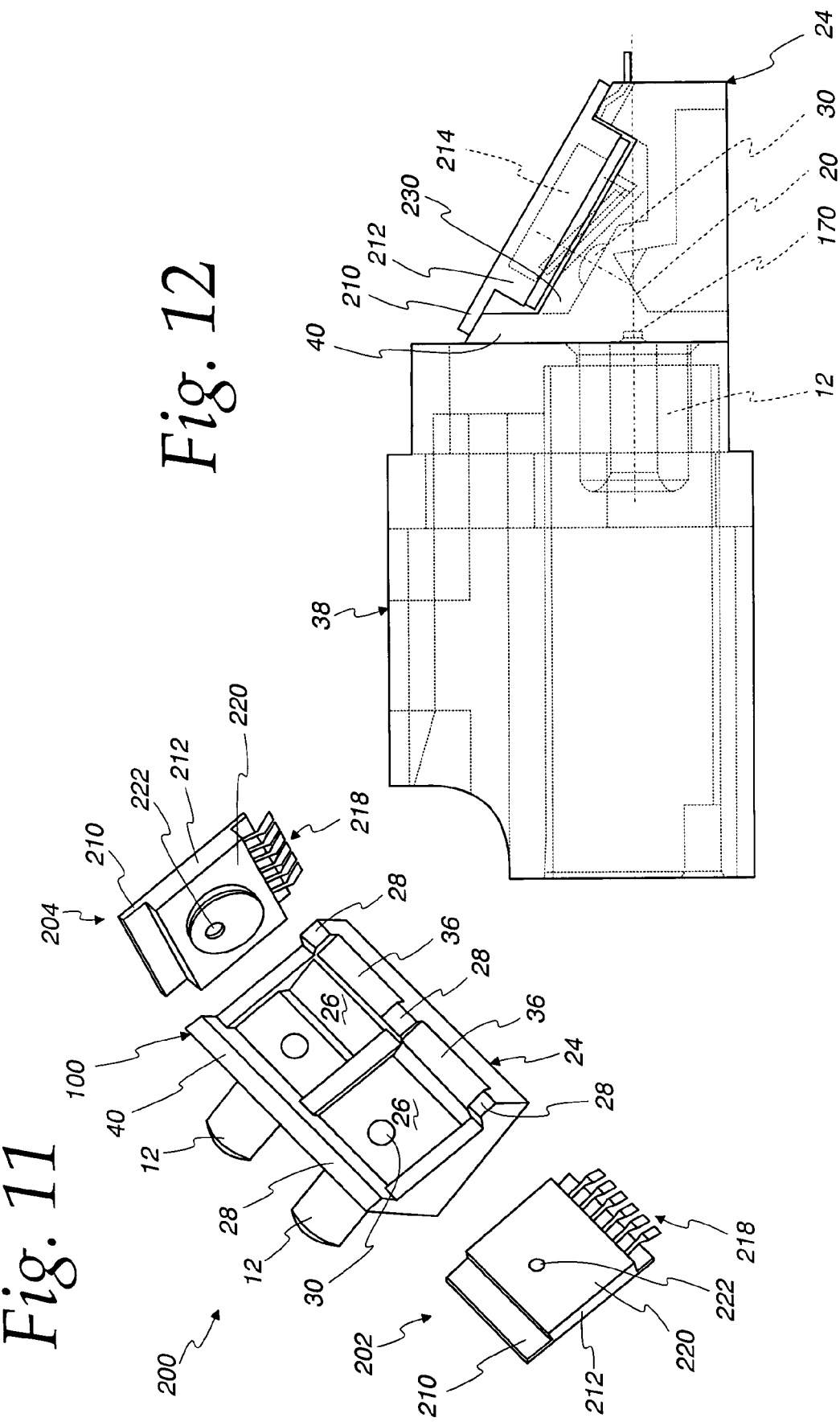

OPTICAL PACKAGES AND METHODS TO MANUFACTURE THE SAME

FIELD OF THE DISCLOSURE

This disclosure relates generally to optical packages, and, more particularly, to optical packages and methods to manufacture the same.

BACKGROUND

Telecommunication, computer networking and other applications have increasingly moved toward fiber optic connections as the push for speed and increased bandwidth has proceeded. This move toward optical networking has given rise to an increased demand for optical components. Thus, a wide variety of transmitters such as vertical cavity surface emitting lasers (VCSELs) and receivers such as photodetectors have been developed.

A variety of housings for coupling receivers, transmitters and/or transceivers to optical waveguides such as optical fibers have also been developed. Some of these housings are meant for use with both transmitters and receivers. Such housings are referred to as optical front ends (OFEs). Other housings are designed for use with receivers but not transmitters. Such housings are referred to as receive optical sub-assemblies (ROSAs). Still other housings are designed for use with transmitters but not receivers. Such housings are referred to as transmit optical sub-assemblies (TOSAs).

BRIEF DESCRIPTION OF THE DRAWINGS

FIG. 2 is a back view of the example housing of FIG. 1.
FIG. 3 is a top view of the example housing of FIG. 1.
FIG. 4 is a front view of the example housing of FIG. 1.
FIG. 5 is a side view of the example housing of FIG. 1.
FIG. 8 is a partially cut away, perspective view of another example housing.
FIG. 9 is a schematic illustration of light passing through a portion of the example housing of FIG. 8.
FIG. 10 is a right, rear perspective view of an example optical package including the housing of FIG. 1 or the housing of FIG. 8.
FIG. 11 is a left, rear perspective view of the example optical housing of FIG. 10 showing the optical elements exploded therefrom.
FIG. 12 is a side, cross-sectional view of the example optical housing of FIG. 10 coupled to a case.

DETAILED DESCRIPTION

Figure 1:
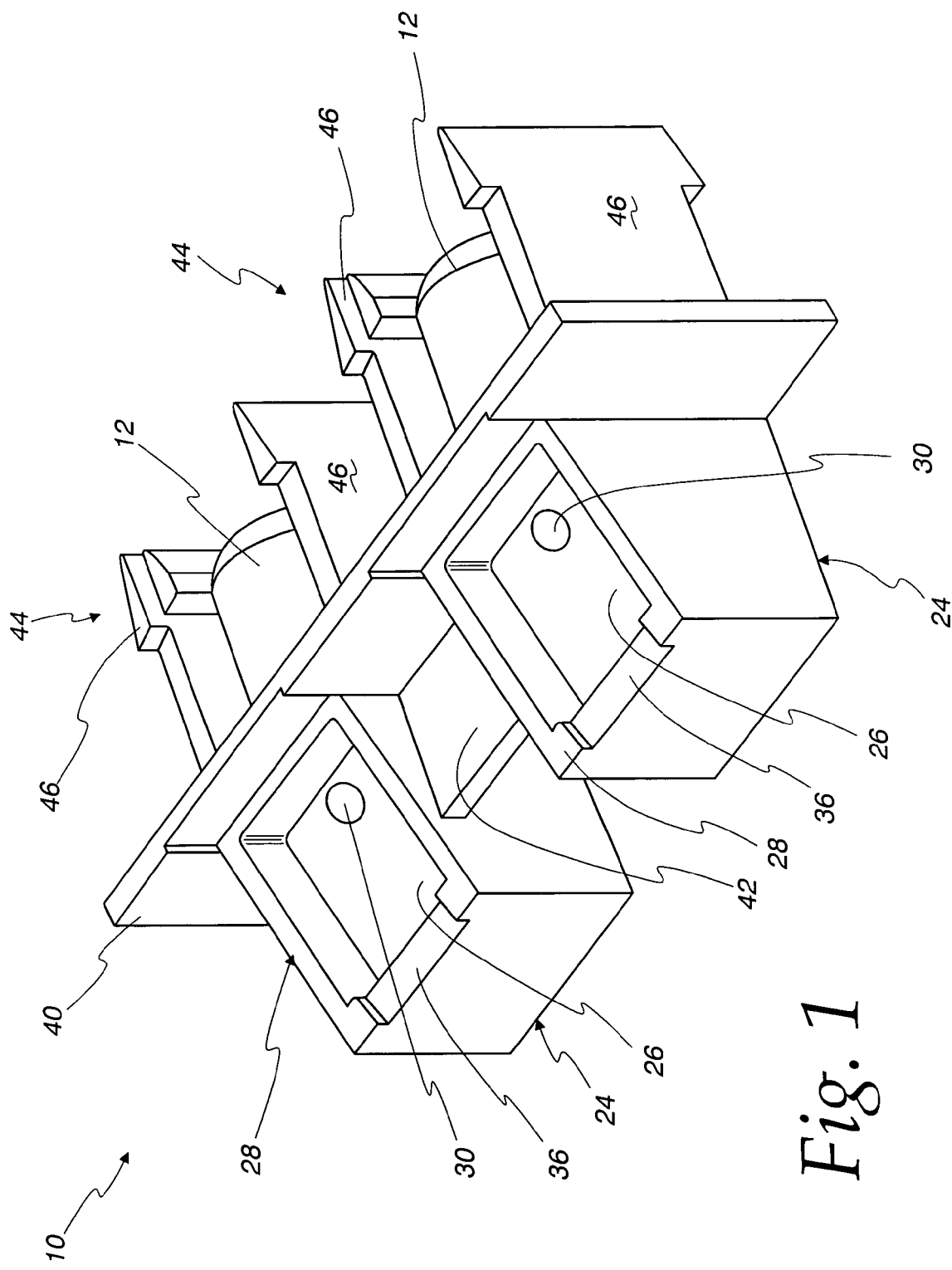
FIG. 1 is a perspective view of an example housing.

FIG. 1 is a schematic illustration of an example housing 10. The housing 10 of FIG. 1 includes two optical paths, and, thus, is well suited for use as an optical front end (OFE) when coupled with a transmitter and receiver. The housing 10 of the illustrated example is a single part that is integrally formed from an optically transparent plastic via a conventional injection molding process. The plastic used to form the housing 10 is selected to have desired optical properties such as desired transmission and index of refraction characteristics at wavelength(s) of interest. The selected plastic should also have good dimensional stability such that the dimensions of the housing 10 will not deviate from the design specifications by large amounts and such that the dimensions of the housing 10 will not change significantly over time. Plastics such as Lexan™ and Ultem™ sold by General Electric Plastics™, and Radel™ and Udel™ sold by Solvay Plastics™ meet these criteria. Injection molding techniques are now known wherein critical dimensions may be manufactured to better than +/−0.003 millimeters (mm) and wherein optical lenses may be formed with sag deviations of less than 0.001 mm. Therefore, the housing 10 may be injection molded to very tight dimensional specifications.

Figure 6:
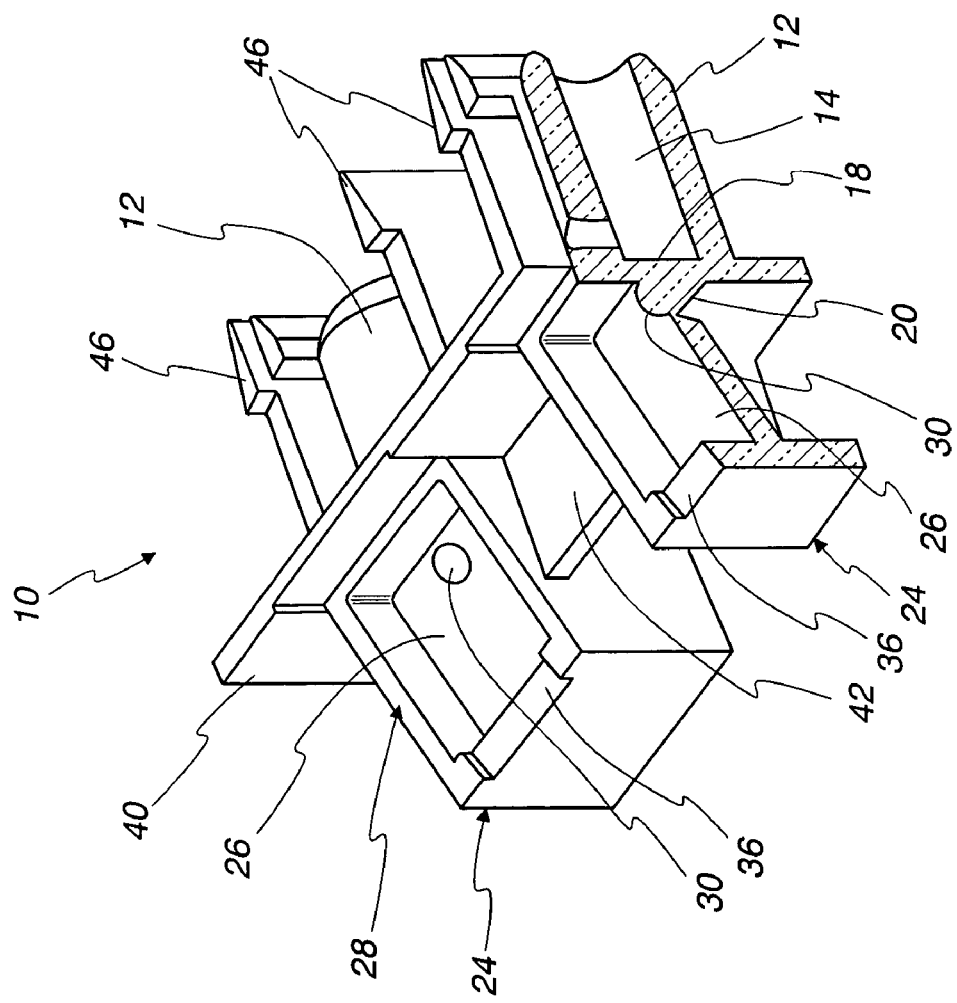
FIG. 6 is a partially cut away, perspective view of the example housing of FIG. 1.
Figure 15:
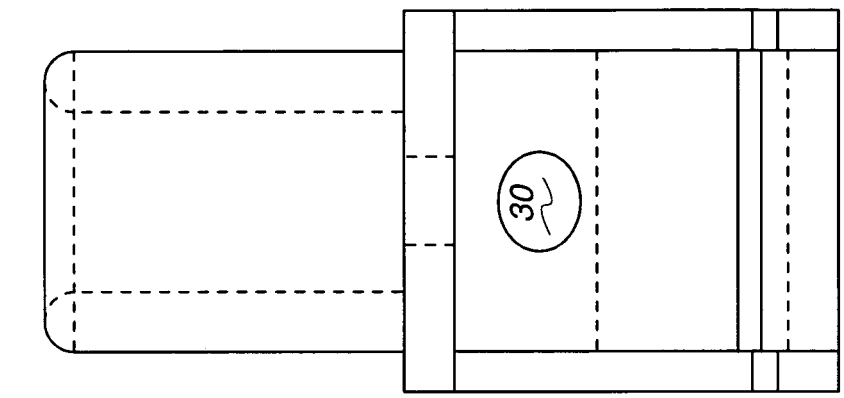
FIG. 15 is a top view of the example housing of FIG. 13.
Figure 14:
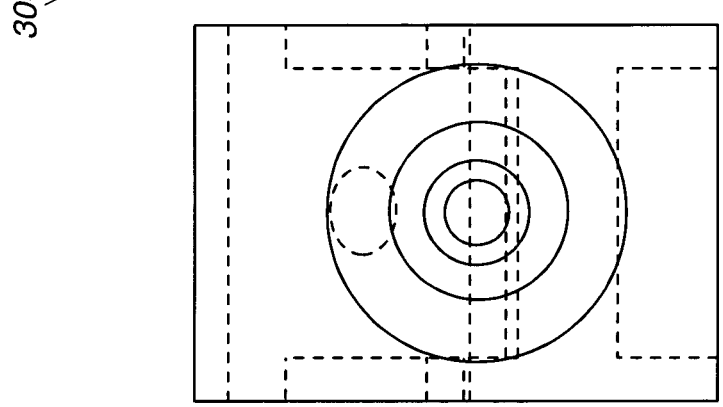
FIG. 14 is a front view of the example housing of FIG. 13.
Figure 13:
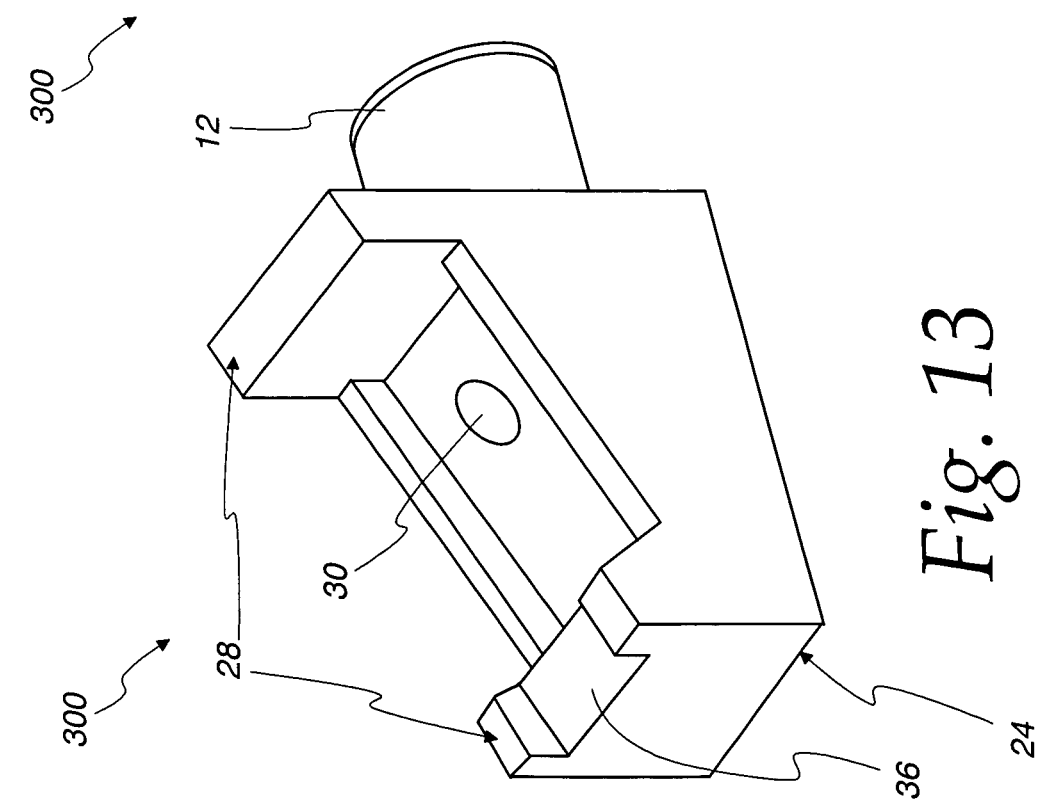
FIG. 13 is a right, rear perspective view of another example housing.
Figure 17:
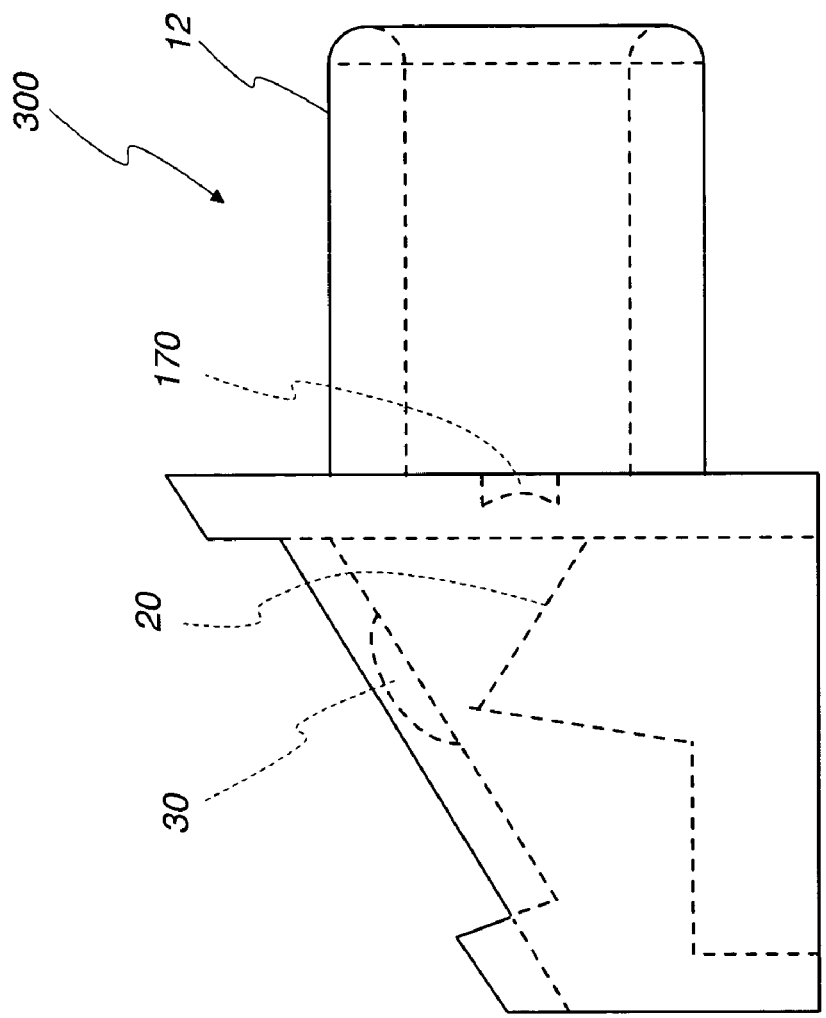
FIG. 17 is a side view of the example housing of FIG. 13.
Figure 16:
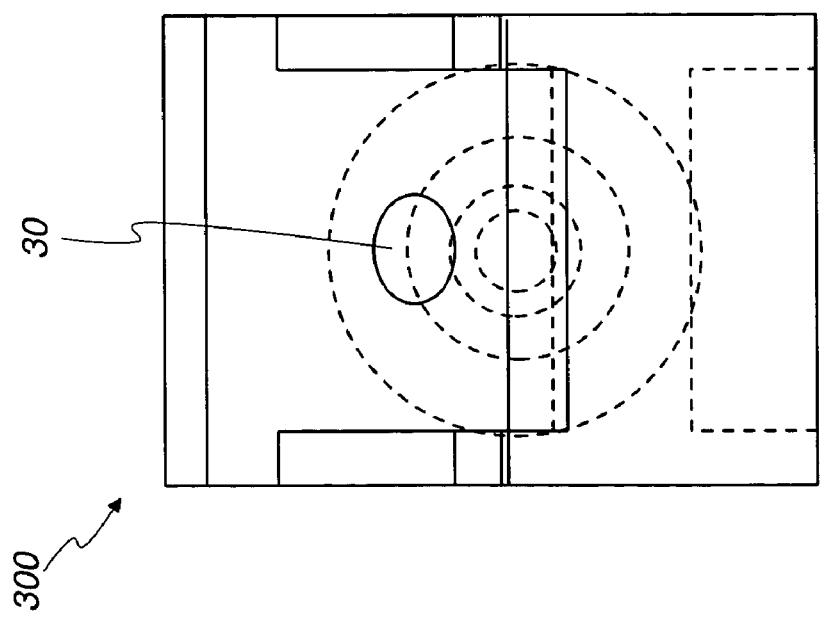
FIG. 16 is a back view of the example housing of FIG. 13.

For the purpose of coupling the housing 10 to optical fibers, the housing 10 of FIG. 1 is provided with a pair of ferrules 12. Each ferrule 12 is structured to receive an end of one optical fiber (not shown). To this end, each ferrule 12 is a generally cylindrical structure defining a central lumen 14 (see FIGS. 4 and 6). The lumens 14 are each sized to receive an end of an optical fiber in tight engagement to ensure the fiber is positioned to transmit and/or receive light traveling along an optical axis of the ferrule 12. To ensure that light traveling to (or from) the fibers passes out of (or into) the housing 10 without substantial reflection, the lumens 14 of the ferrules 12 are implemented as blind holes with the bottoms 18 of the lumens 14 being substantially positioned at right angles to the longitudinal axis of their respective ferrules 12 (see FIG. 6). Because the housing 10 of the illustrated example is constructed of a plastic that is optically transparent at the desired wavelength(s), light will freely travel into and out of the housing 10 through the bottoms 18 of the lumens 14.

In order to direct light through the housing 10, a total internal reflection surface 20 is disposed near a back of each ferrule 12. As most easily seen in FIG. 6, each of the total internal reflection surfaces 20 is formed by an angled external wall of the housing 10. Because the housing 10 of the illustrated example is constructed of plastic that is optically transparent at the wavelength(s) of interest, light passing through the lumens 14 of the ferrules 12 will pass directly into the housing 10 through the bottoms 18 of the lumens 12. However, the portions 20 of the external wall of the housing 10 behind the lumen bases 18 are angled relative to the longitudinal axis of their respective ferrules 12 in accordance with Snell's Law such that light impacting those wall portions 20 will reflect and, thus, remain substantially trapped within the housing 10. The same phenomenon is, of course, also true for light traveling in the opposite direction. Therefore, the total internal reflection surfaces 20 may be used to direct light to and/or from their respective ferrules 12. Indeed, the angle(s) of the total internal reflection surfaces relative to the longitudinal axis of their respective ferrules 12 defines the location(s) of the optical axis of their respective ferrules 12.

For the purpose of coupling optical elements (e.g., receivers, transmitters and/or transceivers) to the housing 10, the illustrated housing 10 is provided with optical element supports 24. As shown in FIG. 1, the supports 24 extend from the rear of the housing 10. Since each optical path is intended to terminate in an optical element, an optical element support 24 is provided for each of the ferrules 12 of the housing 10. Thus, if the housing 10 is provided with two ferrules 12 as in the example of FIG. 1, the housing 10 will include two supports 24. Each support 24 lies on an optical path associated with a respective one of the ferrules 12 and its total internal reflection surface 20 so that light can be transmitted between an optical element mounted on a support 24 and an optical fiber mounted in a corresponding one of the ferrules 12 via the corresponding total internal reflection surface 20.

In the example of FIG. 1, each of the supports 24 is a rectangular columnar structure. The top of each of these structures 24 is truncated at an angle selected to position an optical element in optical alignment with the optical path associated with the support 24. In the illustrated example, the top of each support 24 includes a substrate 26 and an annular mechanical interface 28. Each of the mechanical interfaces 28 of the illustrated example is a wall positioned along and rising upward from its corresponding substrate 26.

Figure 7:
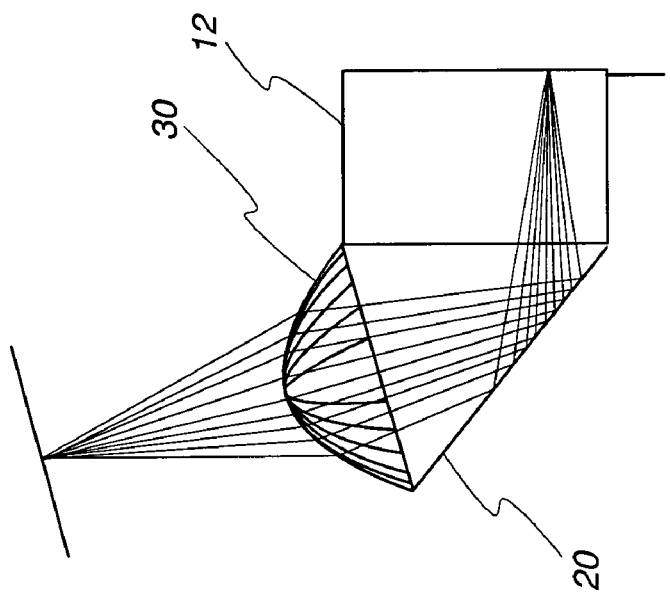
FIG. 7 is a schematic illustration of light passing through a portion of the example housing of FIG. 1.

For the purpose of focusing light traveling toward and/or away from an optical element mounted to the support 24, each of the substrates 26 of the illustrated example is provided with a lens 30. The dimensions of each of the lenses 30 are selected to ensure that light traveling between an optical element mounted to the corresponding support 24 and an optical fiber coupled to the corresponding ferrule 12 is properly focused upon reaching its intended destination via the total internal reflection surface 20 as schematically illustrated in FIG. 7. Either or both of the lenses 30 may be constructed of the same plastic used to form the remainder of the housing 10. Therefore, the lenses 30 may be integrally formed with their corresponding substrates 26 and, thus, as one piece with the housing 10.

As mentioned above, the annular mechanical interfaces 28 of the supports 24 of the illustrated example are positioned along the outer edges of the substrates 26. As a result, each of the annular mechanical interfaces 28 substantially surrounds the lens 30 of its corresponding substrate 26. To facilitate coupling an electrical circuit to the optical elements mounted on the supports 24, each of the annular mechanical interfaces 28 of the illustrated example defines a well 36. The wells 36 are dimensioned to receive an electrical interface of an optical element mounted on the corresponding support 24.

To couple the housing 10 to a case 38 such as a transceiver case (see FIG. 12), the illustrated housing 10 is further provided with a case interface 40. The case interface 40 of the illustrated example is implemented as a vertically oriented wall which extends above and to the sides of the ferrules 12 and the supports 24. In the illustrated example, like the other parts of the housing 10, the case interface 40 is integrally formed with the remainder of the housing 10 during the injection molding process.

To further facilitate coupling a circuit board associated with an optical element to the housing 10, the illustrated housing 10 is further provided with a circuit board interface 42. In the illustrated example, the circuit board interface 42 is a shelf located between two supports 24 and protruding at substantially a right angle to the case interface 40. A circuit board in electrical communication with either or both of the optical elements mounted to the adjacent supports 24 may be mounted to the circuit board interface 42.

As will be appreciated by persons of ordinary skill in the art, some multi-source agreements (MSA's) such as XFP, XPAK, and/or XENPAK specify the required location of the optical axis of the ferrules 12 of optical housings. For instance, some MSA's require the optical axes of the ferrules 12 to be located in substantially the same plane as the circuit board associated with the optical element(s) coupled to the housing 10. Other MSA's require the optical axes of the ferrules 12 to be offset from a top surface of the circuit board associated with the optical element(s) coupled to the housing 10. The illustrated housing 10 is advantageous in that the locations of the optical axes of the ferrules 12 may be set by setting the angular position of the total internal reflection surfaces 20. Further, changing the angular position of the total internal reflection surfaces 20 does not require substantial changes in the layout of the supports 24 or the interface between the supports 24 and the optical elements.

To couple the ferrules 12 to pluggable optical fibers, each of the ferrules 12 of the housing 10 is further provided with an SC connector 44. As is conventional, each of the SC connectors 44 includes a pair of clips 46 disposed on opposite sides of their corresponding ferrules 12. As shown in FIG. 5, the clips 46 extend forwardly of the ferrules 12.

Another example housing 100 is illustrated in FIGS. 8 and 9. The housing 100 is very similar to the housing 10. Therefore, identical structures present in both housings 10, 100 will not be described here. Instead, the interested reader is referred to the above discussion for a more thorough description of the corresponding parts. To facilitate this process, like structures are labeled with identical reference numbers in the housings 10, 100. The same reference numeral convention is followed in the description of the optical package 200 and the housing 300 below.

To provide a longer working distance between the lenses 30 and their corresponding ferrules 12 than was present in the example housing 10, and/or to reduce the aperture sizes of the lenses 30 as compared to the lenses 30 of the housing 10, the housing 100 is provided with second lenses 140. In the example of FIGS. 8 and 9, the second lenses 140 are located at the base of the ferrules 12. Any or all of the ferrules 12 may be provided with such a lens 140. As with the lenses 30, the lenses 140 may be integrally formed with the housing 100 to the desired optical specifications. Thus, the lenses 140 may be constructed of plastic. Despite the advantages mentioned above, including the lenses 140 may have certain drawbacks. For example, in the SONET context, the housing 100 may not meet the long reach and/or the extended reach requirements of that standard.

Unlike the example housing 10, the example housing 100 does not include a printed circuit board interface 42 between its supports 24. Instead, the supports 24 of the housing 100 are disposed immediately adjacent one another. Also, whereas in the example housing 10, the mechanical interface 28 was implemented by an annular wall of substantially uniform height (except at the position of the well 36), in the example of FIG. 8, the mechanical interface 28 includes side walls of reduced height and is partially integrated into the case interface 40.

An example optical package 200 including two optical elements 202, 204 is shown in FIG. 10. The optical package 200 may include any desired housing including the housing 10 discussed above. However, in the illustrated example, the optical package 200 includes the housing 100 of FIGS. 7 and 8.

Each of the optical elements 202, 204 may be implemented as a receiver, a transmitter or a transceiver. In the illustrated example, the optical element 202 is implemented by a receiver and the optical element 204 is implemented by a transmitter such as a VCSEL or an edge emitting diode. Thus, the optical package 200 is an optical front end (OFE) which includes a receive path and a transmit path. The receive path may include the receiver 202, a lens 30, a total internal reflection surface 20, a lens 140 and a ferrule 12 coupled to an optical fiber. The transmit path may include the transmitter 204, a second lens 30, a second total internal reflection surface 20, a second lens 140 and a second ferrule 12 coupled to a second optical fiber. In the illustrated example, the transmit path and the receive path are parallel paths that are offset form one another.

The example receiver 202 and the example transmitter 204 are shown in greater detail in FIGS. 11 and 12. Each of the optical elements 202, 204 includes a substrate 210 and an annular wall 212 coupled to the substrate 210 to define a central well 214 (see FIG. 12). The substrates 210 may be implemented by, for example, a printed circuit board (PCB), ceramic, an FR4 material, an FR408 material, alumina, $AL_2O_3$, aluminum nitride, AIN, or another metal-based material such as kovar. The annular walls 212 may be integrally formed with their corresponding substrates 210. Alternatively, the annular walls 212 may be separately formed from their substrates 210. In the illustrated example, the substrates 210 are implemented by an alumina plate and the annular walls 212 are implemented by a plurality of stacked alumina rings. At least some of the alumina rings provide apertures dimensioned to receive electrical leads 218 to permit electrical connection between components within the central wells 214 and components external to the optical elements 202, 204 (e.g., a printed circuit board mounted on the printed circuit board interface 42).

Each of the optical elements 202, 204 also includes a laser such as a VCSEL and/or a photodetector mounted within its central well 214. It also includes a lid 220 to hermetically seal the central well 214. Each of the lids 220 may be implemented, for example, by a metal or kovar lid welded or soldered to the top of its respective annular wall 212. To facilitate coupling the lids 220 to the walls 212, the top of each of the walls 212 may include a kovar ring.

To permit transmission of light to and/or from the laser and/or photodetector located within the wells 214, each of the lids 220 is provided with a window 222. Each window 222 may be implemented by a glass window which is soldered to its corresponding lid 220 with high temperature solder. The windows 222 may be positioned at an angle (e.g., 15 degrees) relative to their respective lids 220 and may be anti-reflection (AR) coated. The undersurface of the window 222 of the transmitter 204 may be coated with a partially reflecting mirror (e.g., 50% reflecting) to provide a back-faceted photodetector signal. As shown in FIG. 11, the lids 222 may have a variety of different shapes to accommodate the variety of optoelectronic components that may be located within the optical elements 202, 204. Similarly, the substrates 26 of the supports 24 may be dimensioned to accommodate the different shapes of the lids 222.

Each of the optical elements 202, 204 is coupled to a corresponding one of the mechanical interfaces 28 of the supports 24 to form a sealed chamber 230 (see FIG. 12). When so positioned, the lenses 30 are positioned within the sealed chambers in substantial optical alignment with the laser and/or the photodetector of the corresponding optical element 202, 204. Also, when the optical elements 202, 204 are mounted on the mechanical interfaces 28, their electrical interfaces 218 are positioned within the wells 36 of their corresponding supports 24 as shown in FIG. 10.

Although the housings 10, 100 discussed above included two parallel optical paths which are offset from one another, persons of ordinary skill in the art will readily appreciate that housings with less than or more than two optical paths may alternatively be employed. Whereas a housing 10, 100 with two optical paths is ideally suited for use as an optical front end, a housing with only one optical path is suited for use as a receiver optical sub-assembly (ROSA) (e.g., where the optical element is a receiver) or as a transmit optical sub-assembly (TOSA) (e.g., where the optical element is a transmitter).

An example housing 300 having only one optical path is illustrated in FIGS. 13–17. The example housing 300 is substantially identical to one half of the housing 100. Thus, the example housing 300 includes a ferrule 12, a lens 140, a total internal reflection surface 20, a lens 30 carried by a support 24, and a mechanical interface 28. By mounting a transmitter 204 to the mechanical interface 28, the housing 300 may be used as a TOSA. On the other hand, the housing 300 may be used as a ROSA by mounting a receiver 202 to the mechanical interface.

To manufacture an optical package including any of the housings 10, 100, 300 disclosed herein, one may first injection mold the housing 10, 100, 300 to the desired specifications. For instance, the angular position of the total internal reflection surface(s) 20 should be selected to position the optical axes of the ferrule(s) at the desired location(s) relative to the position of the printed circuit board. The housing 10, 100, 300 may include a ferrule 12, a lens 30, a mechanical interface, and a total internal reflection surface 20 as explained above. Once the housing 10, 100, 300 is manufactured, one or more optical elements 202, 204 may be coupled to the mechanical interface(s) 28 as explained above. The optical element(s) 202, 204 may then be electrically coupled to a circuit board. If desired, an optical fiber may then be inserted into each of the ferrule(s) 12.

From the foregoing, persons of ordinary skill in the art will appreciate that the above disclosed methods and apparatus are advantageous in several respects. For example, the disclosed housings 10, 100, 300 are each formed as a single part including an optical ferrule 12, a lens to focus light between a fiber coupled to the ferrule 12 and a laser or photodetector 202, 204 coupled to the housing 10, 100, 300, and a mechanical interface 40, 42 to a case and/or a circuit board. Since the housing 10, 100, 300 is integrally formed, its parts are automatically accurately aligned with one another and no post-injection molding processing of the parts is required. Further, the optical axis of the ferrule 12 and the plane of the top surface of the circuit board coupled to the optical element(s) 202, 204 may be made to be in the same plane or offset from one another by an arbitrary amount simply by changing the angle of the total internal reflection surface 20. Such a change does not materially change the layout of the substrate 26 for the optical element 202, 204.

Furthermore, when the housing 10, 100, 300 includes a receiver path, the position of the receiver is relatively far away from the electrical interface to the circuit board. This positioning reduces or eliminates interference between the sensitive, low-level output of the photodetector and the high level output from the trans-impedance amplifier that is commonly found in prior art ROSA's.

Additionally, the substrate 210 of the optical element 202, 204 is positioned at a small angle relative to the circuit board thereby allowing for an easier electrical transition between the substrate 210 and the board. In contrast, prior art housings typically locate the substrate of the optical element perpendicular to the circuit board, thus, forcing the electrical signals to traverse a 90 degree bend which may have adverse performance consequences in high speed applications (e.g., 10 Giga bits per second).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An optical assembly comprising:
   a housing including:
   a ferrule to receive an optical fiber;
   a substrate
   a lens located on the substrate;
   an annular mechanical interface located on the substrate adjacent the lens, the annular mechanical interface forming a wall at least partially encircling the lens; and
   a total internal reflection surface disposed between the ferrule and the lens to direct light between the ferrule and the lens; and
   an optical element coupled to the mechanical interface of the housing to form a sealed chamber with the substrate and the mechanical interface, the lens being disposed within the sealed chamber to form a direct optical path from the total internal reflection surface through the lens to the optical element.

2. An optical assembly as defined in claim 1 wherein the housing is integrally formed.

3. An optical assembly as defined in claim 2 wherein the housing is an injection molded plastic part.

4. An optical assembly as defined in claim 3 wherein the housing is made of optically transparent plastic.

5. An optical assembly as defined in claim 1 wherein the housing further comprises clips disposed adjacent the ferrule.

6. An optical assembly as defined in claim 1 wherein the housing further comprises an SC connector.

7. An optical assembly as defined in claim 1 wherein the housing further comprises a second lens disposed adjacent a bottom of the ferrule.

8. An optical assembly as defined in claim 1 wherein the housing further comprises a case interface.

9. An optical assembly as defined in claim 1 wherein the housing further comprises a circuit board interface.

10. An optical assembly as defined in claim 1 wherein the total internal reflection surface is disposed at an angle to a longitudinal axis of the ferrule.

11. An optical assembly as defined in claim 10 wherein the angle at least partially defines a location of an optical axis of the ferrule.

12. An optical assembly as defined in claim 11 wherein the optical axis of the ferrule is offset from a top surface of a circuit board associated with the optical element.

13. An optical assembly as defined in claim 11 wherein the optical axis of the ferrule is substantially in a same plane as a top surface of a circuit board associated with the optical element.

14. An optical assembly as defined in claim 1 wherein the optical element comprises at least one of a receiver, a transmitter and a transceiver.

15. An optical assembly as defined in claim 1 wherein the optical element comprises a receiver and the optical assembly is a ROSA.

16. An optical assembly as defined in claim 1 wherein the optical element comprises a transmitter and the optical assembly is a TOSA.

17. An optical assembly as defined in claim 1 wherein the housing further comprises:
   a second ferrule to receive a second optical fiber; and
   a second lens.

18. An optical assembly comprising:
   a housing including:
   a ferrule to receive an optical fiber;
   a lens;
   an annular mechanical interface, the annular mechanical interface forming a wall at least partially encircling the lens; and
   a total internal reflection surface disposed between the ferrule and the lens to direct light between the ferrule and the lens; and
   an optical element coupled to the mechanical interface of the housing to form a sealed chamber, the lens being disposed within the sealed chamber substantially in optical alignment with the optical element, wherein the annular mechanical interface defines a well to receive an electrical interface of the optical element.

19. An optical assembly comprising:
   a housing including:
   a ferrule to receive an optical fiber;
   a lens;
   an annular mechanical interface, the annular mechanical interface forming a wall at least partially encircling the lens; and
   a total internal reflection surface disposed between the ferrule and the lens to direct light between the ferrule and the lens;
   a second ferrule to receive a second optical fiber; and
   a second lens;
   a second annular mechanical interface disposed adjacent to the annular mechanical interface, the second annular mechanical interface forming a second wall at least partially encircling the second lens; and
   a second total internal reflection surface disposed between the second ferrule and the second lens to direct light between the second ferrule and the second lens; and
   an optical element coupled to the mechanical interface of the housing to form a sealed chamber, the lens being disposed within the sealed chamber to form a direct optical path from the total internal reflection surface through the lens to the optical element.

20. An optical assembly comprising:
   a housing including:
   a ferrule to receive an optical fiber;
   a lens;
   an annular mechanical interface, the annular mechanical interface forming a wall at least partially encircling the lens;
   a total internal reflection surface disposed between the ferrule and the lens to direct light between the ferrule and the lens;
   a second ferrule to receive a second optical fiber;
   a second lens; and
   an optical element coupled to the mechanical interface of the housing to form a sealed chamber, the lens being disposed within the sealed chamber substantially in optical alignment with the optical element; and
   a second optical element coupled to a second annular mechanical interface.

21. An optical assembly as defined in claim 20 wherein the housing comprises an optical front end.

22. An optical assembly comprising:
a housing including:
  a ferrule to receive an optical fiber;
  a lens;
  an annular mechanical interface, the annular mechanical interface forming a wall at least partially encircling the lens; and
  a total internal reflection surface disposed between the ferrule and the lens to direct light between the ferrule and the lens; and
  an optical element coupled to the mechanical interface of the housing to form a sealed chamber, the lens being disposed within the sealed chamber substantially in optical alignment with the optical element, wherein the annular mechanical interface defines a well to receive an electrical interface of the optical element, and wherein the optical element comprises:
a substrate;
an annular wall coupled to the substrate to define a central well;
a lid coupled to the annular wall to form a hermetic seal;
a window disposed within the lid; and
at least one of a laser and a photodetector disposed within the central well.

23. An optical assembly as defined in claim 22 wherein the window is a glass window soldered to the lid.

24. An optical assembly as defined in claim 23 wherein the window is coated to provide a back faceted photodetector signal.

25. An optical assembly as defined in claim 24 wherein the window is positioned at an angle relative to the substrate.

26. An optical assembly as defined in claim 22 further comprising an electrical interface coupled to the at least one of the laser and the photodetector, and passing through at least one of the wall, the substrate and the lid.

27. An optical assembly as defined in claim 22 wherein the transmitter is a VCSEL.

* * * * *